United States Patent [19]
Nakama

[11] 3,954,344
[45] May 4, 1976

[54] COUPLING MECHANISM

[75] Inventor: Daiji Nakama, Usunomiya, Japan

[73] Assignee: NIFCO Inc., Tokyo, Japan

[22] Filed: Mar. 26, 1975

[21] Appl. No.: 562,078

[30] Foreign Application Priority Data
Mar. 30, 1974 Japan.............................. 49-35635

[52] U.S. Cl. ................................ 403/14; 403/348; 403/323; 403/408; 24/73 RM
[51] Int. Cl.² ......................................... A44B 17/00
[58] Field of Search ......... 24/73 RM, 221 L, 221 R; 403/14, 408, 348, 349, 343, 409, 323; 52/758 D

[56] References Cited
UNITED STATES PATENTS

| | | | |
|---|---|---|---|
| 1,744,488 | 1/1930 | Mitchell | 24/221 R |
| 2,826,388 | 3/1958 | Janos et al. | 24/221 L |
| 3,182,770 | 5/1965 | Shemet | 24/221 R |
| 3,220,078 | 11/1965 | Preziosi | 24/221 L |
| 3,407,454 | 10/1968 | Moyatt | 24/221 R |

*Primary Examiner*—Andrew V. Kundrat
*Attorney, Agent, or Firm*—Jack R. Halvorsen; Robert W. Beart

[57] ABSTRACT

Disclosed is an improvement in a coupling mechanism for uniting two plates comprising a coupling member and associated apertures in the plates wherein the coupling member comprises a head portion and two legs integrally connected to the head portion and each having a stepped engaging portion on the periphery thereof, whereby when the two legs are inserted in the apertures of the two plates and rotated by 90°, the stepped engaging portions catch some selected parts of the circumference edge of the aperture of one of the plates, and clamp these plates in cooperation with the head portion, which is pushed against the other plate. The coupling mechanism according to this invention further comprises means to regulate the rotation angle of the shank of the coupling member at 90°, thus preventing the shank of the coupling member from overrunning the stop position at which the stepped portions catch selected parts of the circumference edge of the aperture of one of the plates to be coupled.

1 Claim, 8 Drawing Figures (B)

(A)

COUPLING MECHANISM

BACKGROUND OF THE INVENTION

This invention relates to a mechanism for coupling two plates. The coupling member used in this coupling mechanism is formed of molded synthetic resin and comprises an umbrella-shaped head portion and two legs extending from the underside of the head portion and each having a stepped engaging portion on the periphery thereof.

In use of a coupling mechanism of this type, the two legs of the coupling member are inserted in elliptical apertures of upper and lower plates, and the head portion of the member is pushed against the upper plate and is rotated by 90°, thus causing the stepped engaging portions of the legs to shift from the long-diametric opposing portions of the ellipse aperture of the lower plate to the short-diametric opposing portions of the ellipse and to engage with the short-diametric opposing portions of the ellipse circumference, whereby the two plates are resiliently clamped between the head portion and the stepped engaging portions of the legs. Therefore, in conventional member, it is necessary to align the stepped engaging portions with the short-diametric opposing portions of the ellipse aperture of the lower plate and to keep them in this position. Stated otherwise, if the coupling member is rotated beyond 90°, the stepped engaging portions overrun the short-diametric opposing portions of the ellipse aperture, thus releasing the two plates from each other. Therefore, in use a worker must use care to rotate the member by exactly 90° to put the stepped engaging portions in engagement with the short-diametric opposing portions of the ellipse aperture. This requires a careful rotating operation for coupling. Therefore, the work of coupling a large number of plates by means of coupling members of the type mentioned above is tedious and time consuming.

The object of this invention is to provide a coupling mechanism for uniting two plates which is free from the defects mentioned above, permitting automatically regulated and effective coupling work at a high efficiency.

SUMMARY OF THE INVENTION

To attain this object the coupling mechanism for uniting two plates has means to regulate the rotation angle of the shank of the coupling member exactly at 90° thus preventing the shank of the coupling member from overrunning the stop position at which the shank engages one of the plates so as to clamp these plates in cooperation with the head portion of the member, which is adapted to engage the other plate. This automatic and positive regulation of the rotation angle of the shank of the coupling member in use, permits effective coupling work at an increased efficiency.

BRIEF EXPLANATION OF THE DRAWINGS

This invention will be better understood from the following description which is made with reference to the drawings.

DETAILED DESCRIPTION OF THE INVENTION

Figure 4:
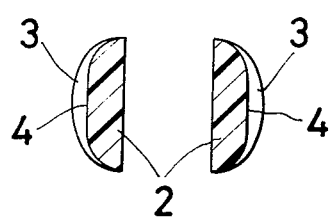
FIG. 4 is a sectional view taken along the line IV — IV of FIG. 2.
Figure 1:
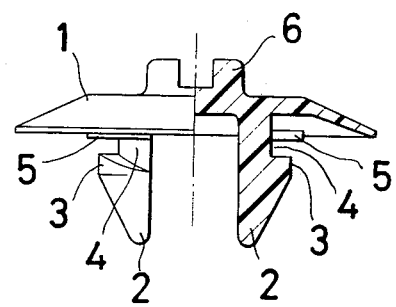
FIG. 1 is a front view showing partly in section, one embodiment of the coupling member according to this invention.
Figure 5:
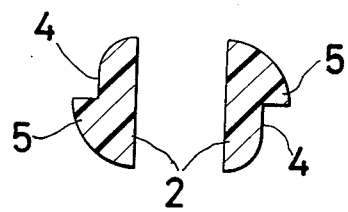
FIG. 5 is a sectional view taken along the line V — V of FIG. 2.
Figure 2:
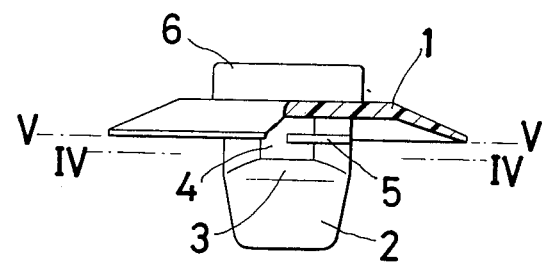
FIG. 2 is a side view (right) showing partly in section, the same embodiment as shown in FIG. 1.

Referring to the drawings, 1 is the umbrella-shaped head portion of the coupling member, and 2 and 2 are a pair of parallel legs extending from the concave underside of the head portion.

The two legs 2, 2 extend in opposing relation with respect to the central axis of the head portion 1, and each of the legs has an outward projection 3 on the periphery thereof at a given level. In this particular embodiment, each leg is tapered over the longitudinal length from the projecting step to the end of the leg in the form of a wedge so as to allow the leg to pass through apertures of two plates, which are later described.

The neck portion 4 extends from the stepped engaging portion 3 to the underside of the head portion 1, and the neck portion is shaped in the form of an arc so as to allow the shank of the coupling member to smoothly rotate along the guide portion of the circumference of the aperture of the upper plate. The neck has a stopping projection 5.

In this particular embodiment a knob 6 is integrally connected to the convex surface of the head portion. The coupling device is molded of synthetic resin having a proper hardness and elasticity. Upper and lower plates 7 and 8 to be coupled have elliptical apertures 9 and 10 to receive the legs of the member, and these plates are laid and opposed with the aperture of the upper plate overlying that of the lower plate.

Figure 6:
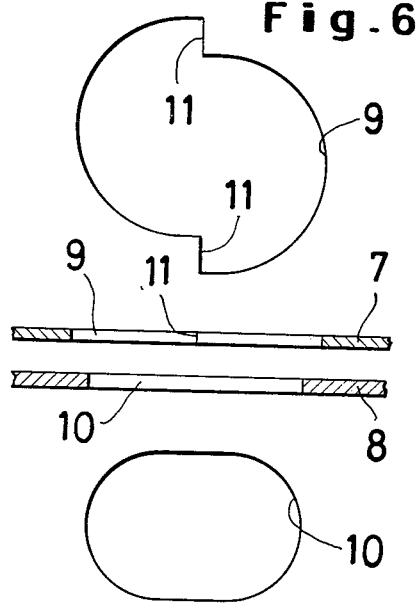
FIG. 6 shows the shapes of the apertures of the upper and lower plates and the positioning relation therebetween.
Figure 3:
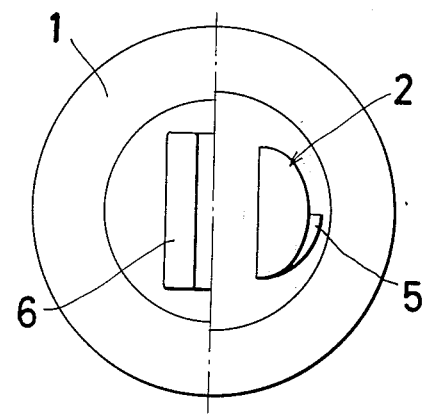
FIG. 3 shows the top view of the embodiment at the left and the bottom view thereof at the right.
Figure 7:
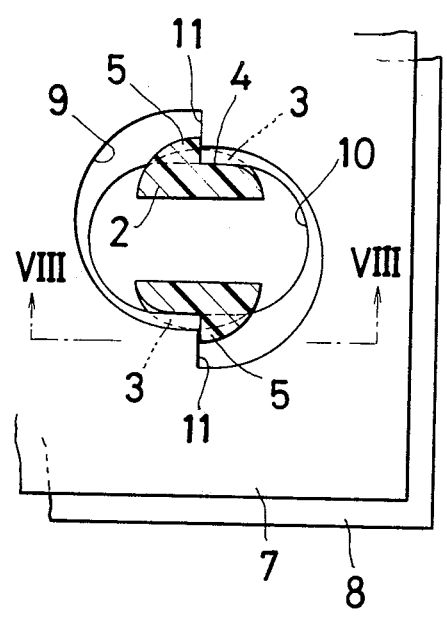
FIG. 7 shows the manner in which the upper and lower plates are coupled with each other (FIG. 7A shows the condition in which the legs of the coupling member are inserted in the apertures of the upper and lower plates, whereas FIG. 7B shows the condition in which the coupling member is rotated to clamp the upper and lower plates.
Figure 7:
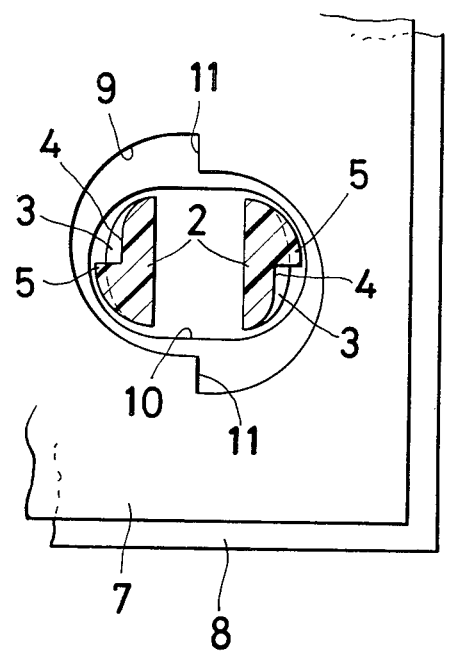

As shown in FIGS. 6 and 7, the aperture 10 of the lower plate 8 is smaller than the aperture 9 of the upper plate 7. The size of the longer diameter of the aperture 10 is large enough to allow the two legs of the coupling member to pass therethrough without catching the stepped projections, whereas the size of the shorter diameter of the aperture is as large as the diameter of the neck portion 4 of the shank. The aperture 9 of the upper plate is somewhat larger than the aperture 10 of the lower plate. Also, the shape of the aperture 9 of the upper plate is different from the elliptical aperture 10 of the lower plate. The shape of the upper aperture 9 is determined by laying two quadrants of a circle on an ellipse in symmetrical opposing relation contiguous with respect to the center of the elliptical aperture and enlarging the elliptical aperture by removing the portions of the upper plate underlying the excursion areas of the quadrants which extend beyond the elliptical aperture. Thus, the aperture has two stepped stopping portions 11, which prevent further rotation of the coupling member when the counter stopping projections 5 of the neck portion are brought in contact with the stepped stopping portions 11.

In use, upper and lower plates 7 and 8 are laid in opposing relation, and the aperture 9 of the upper plate 7 is put in alignment with the aperture 10 of the lower plate 8. The shank of the coupling member is inserted in the upper and lower apertures, and the head portion 1 is pushed against the upper plate 7, yieldingly enlarging the whole size of the umbrella-shaped head portion. Then, the head portion is rotated by the knob 6, thus shifting the stepped engaging portions 3, 3 of the legs 2, 2 from the long-diametric opposing portions to the short-diametric opposing portions of the circumference of the lower aperture. When the pushing force is released, the head portion returns to the original shape, pulling up and engaging the stepped engaging portions of the legs with the underside of the lower plate. Thus, the upper and lower plates are clamped between the head portion and the stepped engaging portions of the legs. As mentioned earlier, as the shank of the coupling member rotates, the stopping projections 5, 5 of the neck 4 rotate and abut against the counter stepped stopping portions 11, 11 of the aperture 9 to prevent further rotation and the stepped engaging portions 3, 3 of the legs are fixedly retained at the short-diametric opposing portions of the aperture of the lower plate.

Figure 8:
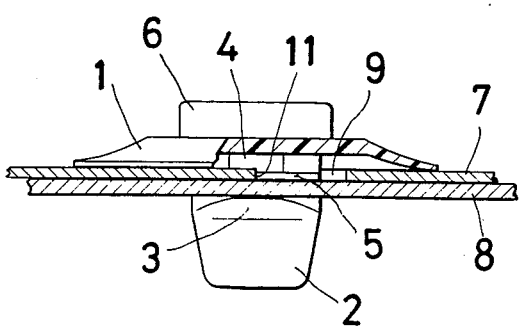
FIG. 8 shows partly in section, the coupling member in the state of coupling the upper and lower plates.

FIG. 7(A) shows the manner in which the legs 2, 2 of the coupling member are inserted in the apertures 9, 10 of the upper and lower plates, whereas FIG. 7(B) shows the manner in which the coupling member is rotated to clamp the plates. FIG. 8 shows a side view of the coupling member which clamps the upper and lower parts.

As mentioned earlier, the stopping projections 5, 5 of the neck 4 are adapted to abut against the stepped stopping portions 11, 11 of the upper plate to prevent further rotation of the coupling member. It is necessary to leave between the stopping projections 5, 5 and the stepped engaging portions 3, 3 a space large enough to receive the thickness of the lower plate 8, and it is necessary for the stopping projections to be at the same level as the overlying upper plate. Thus, the level at which the stopping projections 5, 5 project from the neck is determined by the thickness of the upper and lower plates. Likewise, the distance between the underside of the head portion 1 and the stepped engaging portions 3, 3 is determined by the thickness of the upper and lower plates so as to assure the positive gripping of the plates. Specifically, the distance between the underside of the head portion and the stepped engaging portions 3, 3 is so determined that the stepped engaging portions engage with the short-diametric opposing portions of the elliptical aperture 10 of the lower plate with the result that the umbrella-shaped head portion is pushed against the upper plate and is yieldingly deformed with increasing contact area of the circumference of the head portion. In this particular embodiment, the neck portion of each leg has a vertical side. This vertical side is brought into parallel and contact relation with one of the short-diametric opposing portions of the aperture 10 of the lower plate when the shank of the coupling member is inserted and rotated by 90 degrees and the opposing close contact thus attained between the vertical side of the neck and the short-diametric opposing portion of the aperture circumference contributes to the stopping action to prevent further rotation of the shank of the coupling member. The step of the stepped engaging portion 3 is formed to have such a slope that the stepped portion may slip in under the lower plate when the stepped portion is shifted from the long-diametric opposing portion to the short-diametric opposing portion of the aperture circumference of the lower plate.

With the arrangement above specified, when a coupling member of this invention is inserted and rotated in the apertures 9 and 10 of the upper and lower plates 7 and 8, the coupling member unites these plates with each other by allowing the stepped engaging portions 3, 3 of the legs 2, 2 to slip in and engage with the underside of the short-diametric opposing portion of the aperture 10 of the lower plate 8. When the coupling member is rotated, the stopping projections 5, 5 of the neck abut against the stepped stopping portions of the aperture 9 of the upper plate 7, thus stopping the rotation of the coupling member at the time the stepped engaging portions 3, 3 engage the short-diametric opposing portions of the aperture of the lower plate. Therefore, it is impossible for the stepped engaging portions to depart from the short-diametric opposing portions of the aperture to release the engaging relation as a result of overrunning. If the stepped stopping portions 11, 11 are provided on the short-diametrically opposing portion as shown in FIG. 7, the coupling member is inserted and rotated by 90 degrees in the clockwise direction until the rotation is prevented, and then the positive coupling of the plates is attained. This simple and automatic coupling action is very advantageous because it is very simple to adjust the rotation angle of the device to assure positive coupling, and therefore the efficiency of coupling work is much improved.

Although a preferred embodiment is described above, numerous modifications are apparent to those skilled in the art, as for instance the stepped stopping portions 11, 11 may be replaced by two projections extending from opposing parts of the circumference of a circular aperture, which is made somewhat large. The aperture 9 of the upper plate may be in other shapes than an ellipse, but the size of the aperture 9 must be smaller than the head portion and equal to or larger than the size of the apertures 10 of the lower plate.

What is claimed is:

1. In a coupling mechanism for uniting two plates which comprises a coupling member and cooperatively engaging apertures in said plates, said coupling member being integrally formed of synthetic resin to have an umbrella-shaped head portion (1) having a knob (6) at the upper portion thereof and two legs (2,2) each having a stepped engaging portion (3) on the periphery thereof and perpendicularly extending from the underside of said head portion, whereby overlying upper and lower plates (7,8) are coupled by inserting said two legs through their aligned elliptical apertures (9,10) and rotating said knob by 90° to cause said stepped engaging portions to move toward and engage with the underside of said lower plate (8) at the short-diametric opposing portions of the aperture thereof, the improvement wherein said coupling member further comprises stopping projections (5,5) each provided on the neck portion (4) above said stepped engaging portion (3) of the leg (2) and the aperture in said upper plate (7) is provided with stepped stopping portions (11,11) on said upper aperture the shape which is formed by laying two quadrants of a circle in symmetrical opposing relation contiguous with respect to the center of an elliptical aperture and enlarging the elliptical aperture by removing the portions of the upper plate underlying the excursion areas of the quadrants which extend beyond the elliptical aperture, whereby said stopping projections (5,5) engage with stopping portions (11,11) to stop the rotation of said coupling member at 90°.

* * * * *